United States Patent
Ushiyama

(10) Patent No.: US 7,836,415 B2
(45) Date of Patent: Nov. 16, 2010

(54) CIRCUIT DESIGN METHOD AND CIRCUIT DESIGN SYSTEM FOR CALCULATING POWER CONSUMPTION CONSIDERING IR-DROP

(75) Inventor: Kenichi Ushiyama, Kawasaki (JP)

(73) Assignee: Fujitsu Semiconductor Limited, Yokohama (JP)

( * ) Notice: Subject to any disclaimer, the term of this patent is extended or adjusted under 35 U.S.C. 154(b) by 361 days.

(21) Appl. No.: 11/898,916

(22) Filed: Sep. 17, 2007

(65) Prior Publication Data
US 2008/0077897 A1   Mar. 27, 2008

(30) Foreign Application Priority Data
Sep. 26, 2006   (JP)   ............................. 2006-261070

(51) Int. Cl.
*G06F 17/50* (2006.01)
(52) U.S. Cl. ..................................... 716/4; 716/5; 716/6
(58) Field of Classification Search .................... 716/1, 716/4, 5; 703/18
See application file for complete search history.

(56) References Cited

U.S. PATENT DOCUMENTS

| | | | |
|---|---|---|---|
| 6,167,560 A * | 12/2000 | Jenkins, IV et al. ........... | 716/17 |
| 6,938,233 B2 * | 8/2005 | Satoh et al. .................... | 716/10 |
| 7,240,304 B2 * | 7/2007 | Dutta et al. .................... | 716/4 |
| 7,480,875 B2 * | 1/2009 | Satoh et al. .................... | 716/1 |
| 2004/0243952 A1 * | 12/2004 | Croix .............................. | 716/4 |
| 2008/0040563 A1 * | 2/2008 | Brittain et al. ................. | 711/154 |

FOREIGN PATENT DOCUMENTS

JP   2002-342400   11/2002

\* cited by examiner

*Primary Examiner*—Vuthe Siek
(74) *Attorney, Agent, or Firm*—Fujitsu Patent Center

(57) ABSTRACT

In a circuit design method, a computer calculates power of each of cells, calculates an IR drop value by calculating a voltage decreased due to an IR drop for each cell by using the power for each cell, determines whether a difference between a current IR drop value and a previous IR drop is equal to or less than a predetermined value, and defines a voltage after the IR drop occurs for each cell by using the IR drop value when the difference is greater than the predetermined value. The computer repeats calculating the power, calculating the IR drop value, and defining the value after the IR drop occurs until the difference becomes equal to or less than the predetermined value.

7 Claims, 3 Drawing Sheets

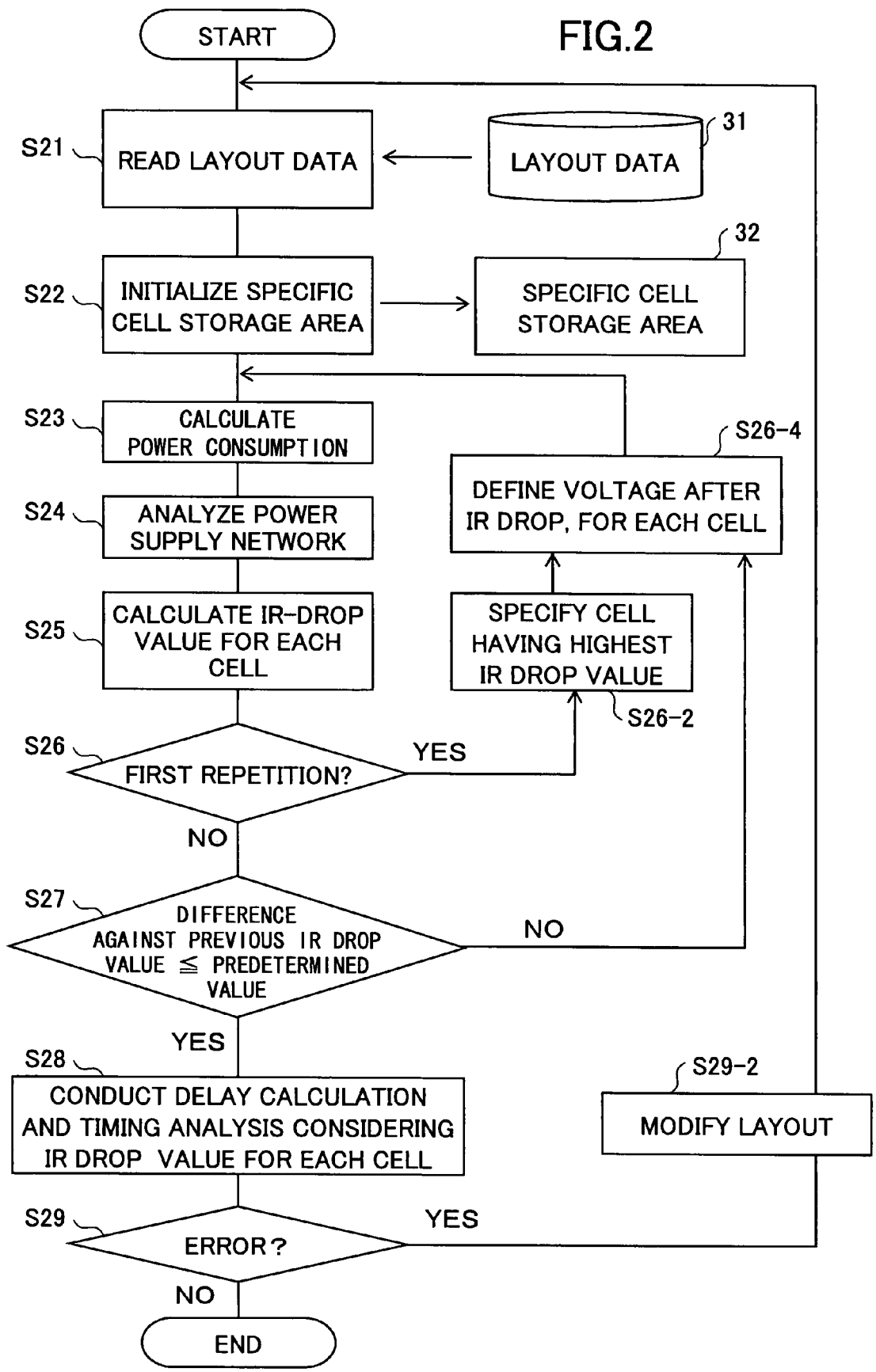

FIG.3A

1st REPEAT

| CELL IDENTIFICATION INFORMATION | VOLTAGE (V) | POWER (W) | POWER CONSUMPTION (W) | IR DROP VALUE (V) |
|---|---|---|---|---|
| CELL A | 1 | Pa1 | Pa1+Pb1+··· | 1 |
| CELL B | 1 | Pb1 | | 0.8 |
| ··· | ··· | ··· | | ··· |

FIG.3B

2nd REPEAT

| CELL IDENTIFICATION INFORMATION | VOLTAGE (V) | POWER (W) | POWER CONSUMPTION (W) | IR DROP VALUE (V) |
|---|---|---|---|---|
| CELL A | 1 | Pa1 | Pa1+Pb2+··· | 1 |
| CELL B | 0.8 | Pb2 | | 0.9 |
| ··· | ··· | ··· | | ··· |

FIG.3C

3rd REPEAT

| CELL IDENTIFICATION INFORMATION | VOLTAGE (V) | POWER (W) | POWER CONSUMPTION (W) | IR DROP VALUE (V) |
|---|---|---|---|---|
| CELL A | 1 | Pa1 | Pa1+Pb3+··· | 1 |
| CELL B | 0.9 | Pb3 | | 0.95 |
| ··· | ··· | ··· | | ··· |

# CIRCUIT DESIGN METHOD AND CIRCUIT DESIGN SYSTEM FOR CALCULATING POWER CONSUMPTION CONSIDERING IR-DROP

CROSS-REFERENCE TO RELATED APPLICATIONS

The application is based on Japanese Priority Application No. 2006-261070 filed Sep. 26, 2006, the entire contents of which are hereby incorporated by reference.

BACKGROUND

1. Field

The embodiment generally relates to a circuit design method and a circuit design system, in which a power consumption considering an IR-drop can be calculated.

2. Description of the Related Art

Conventionally, in an LSI (Large Scale Integration) design, in a case of supplying power to a chip, it is assumed that the same power supply voltage is applied to all cells arranged on the chip, and power to be consumed is calculated for each cell. By using the calculated power to be consumed, a voltage drop, that is, an IR-drop is calculated based on a resistance value of the power supply of the chip. Also, a voltage decreased due to the IR-drop is calculated for each cell. After that, a simulation including a delay calculation and a timing analysis is performed by using the calculated power to be consumed and the calculated power for each cell after the IR-drop.

However, since the power to be consumed by the chip is calculated in a state in which the IR-drop does not occur and the power decreased due to the IR-drop is calculated, a voltage different between the power to be consumed and the power decreased due to the IR-drop is greater than an actual voltage difference. Accordingly, it is required to guarantee a voltage in a wider range for each cell, and thus, it is demanded to assure excessive timing in a design stage. As a result, a voltage range is guaranteed much more than is actually required, and a chip size and a cost are increased.

SUMMARY

The embodiment provided that a circuit design method causing a computer to design a circuit including, calculating a power consumption of a chip based on a voltage of each of cells after an IR-drop occurs.

BRIEF DESCRIPTION OF THE DRAWINGS

Other objects, features and advantages of the embodiment will become more apparent from the following detailed description when read in conjunction with the accompanying drawings, in which:

FIG. 2 is a flowchart diagram for explaining a circuit design method in which power to be consumed is calculated considering an IR-drop, according to the embodiment; and FIG. 3A, FIG. 3B, and FIG. 3C are diagrams illustrating a data structure developed by a repeat process according to the embodiment.

DESCRIPTION OF THE PREFERRED EMBODIMENT

Figure 1:
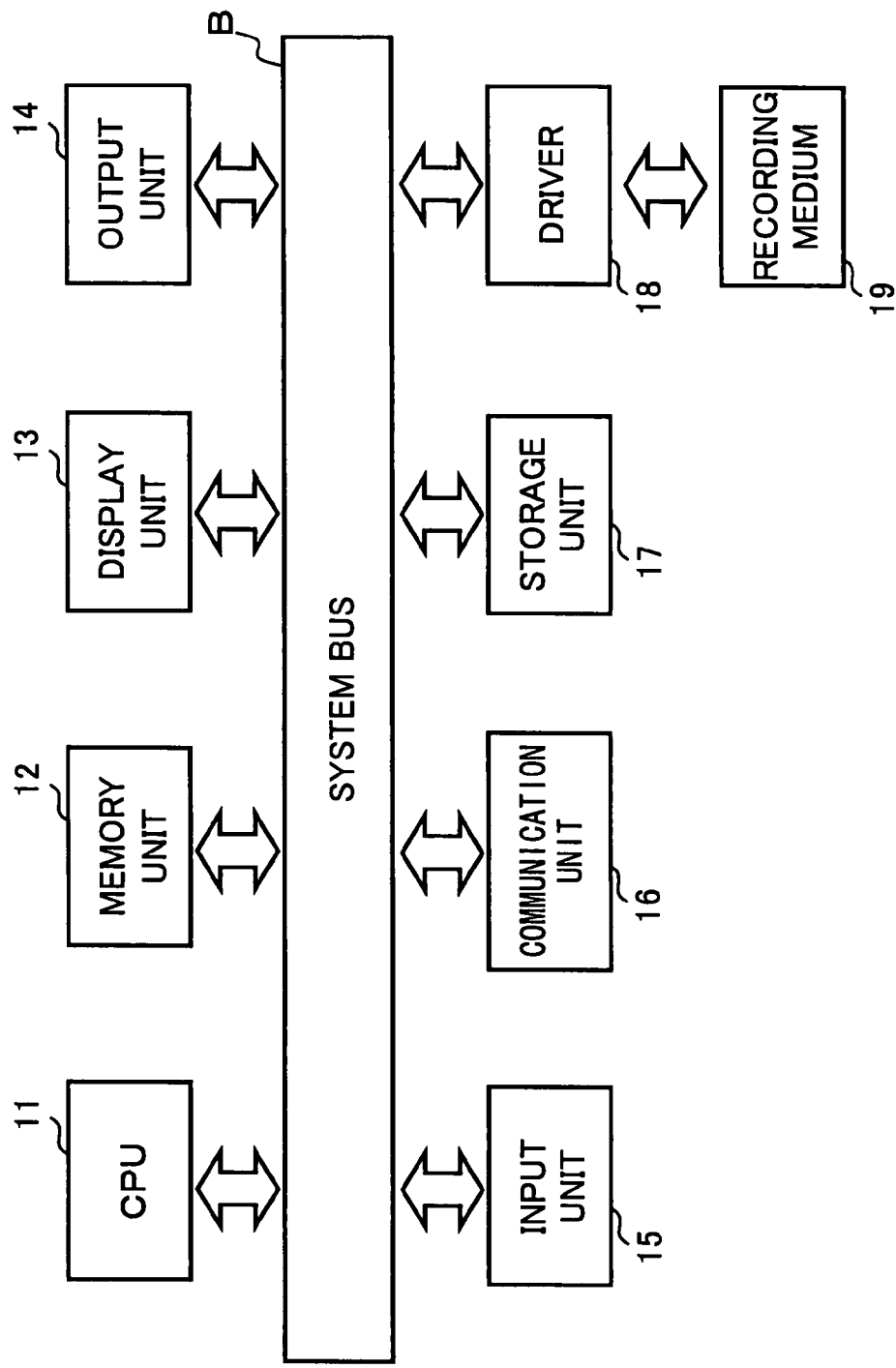
FIG. 1 is a block diagram showing a hardware configuration of a simulation system according to an embodiment.

In the following, an embodiment will be described with reference to the accompanying drawings.

A simulation system realizing a circuit design method according to the embodiment has a hardware configuration as shown in FIG. 1. FIG. 1 is a block diagram showing the hardware configuration of the simulation system according to the embodiment.

In FIG. 1, the simulation system 100 is an apparatus controlled by a computer, and includes a CPU (Central Processing Unit) 11, a memory unit 12, a display unit 13, an output unit 14, an input unit 15, a communication unit 16, a storage unit 17, and a driver 18, which are mutually connected by a system bus B.

The CPU 11 controls the simulation system 100 in accordance with a program stored in the memory unit 12. The memory unit 12 includes a RAM (Random Access Memory), a ROM (Read-Only Memory), and a like, and stores programs executed by the CPU 11, data necessary to be processed by the CPU 11, data acquired in an execution of CPU 11, and a like. Also, an area of the memory unit 12 is partially assigned as a work area which is used in a process of the CPU 11.

The display unit 13 is controlled by the CPU 11 to display various types of information. The output unit 14 includes a printer and a like, and is used to output various types of information in response to an instruction of a user. The input unit 15 includes a mouse, a keyboard, and a like, and is used for the user to input various types of information which are necessary for the CPU 11 to process.

The communication unit 16 is a unit which controls communications for the simulation system 100 through a network such as the Internet, a LAN (Local Area Network), or a like.

The storage unit 17 includes a hard disk unit, and stores programs and data to perform various processes.

For example, a program realizing a process conducted by the simulation system 100 in the circuit design method is provided by a recording medium 19 such as a CD-ROM (Compact Disk Read-Only Memory) or a like. That is, when the recording medium 19 storing the program is inserted into the driver 18, the driver 18 reads out the program from the recording medium 18, and the program is installed to the storage unit 17 via the system bus B. After that, when the program is executed, the CPU 11 starts the process in accordance with the program being stored in the storage unit 17.

It is noted that a medium for storing the program is not limited to the CD-ROM but may be any computer-readable recording medium. The program realizing the process in the circuit design method according to the embodiment may be downloaded through a network by the communication unit 16, and may be installed to the storage unit 17. Also, in a case in which the simulation system 100 includes an interface such as a USB (Universal Serial Bus) for connecting an external recording medium, the program may be read from the external recording medium by a USB connection.

The circuit design method conducted by the CPU 11, in which the power to be consumed is calculated considering the IR-drop, will be described with reference to FIG. 2. FIG. 2 is a flowchart diagram for explaining the circuit design method in which the power to be consumed is calculated considering the IR-drop, according to the embodiment.

In FIG. 2, steps S23 through S27 are repeated and hereinafter, called a repeat process. The CPU 11 reads out layout data 31 in which a placement and routing is completed (step S21), and initialize a specific cell storage area 32 for setting cell information of a cell specified where the IR-drop is maximum (step S22). For example, zero is set to the specific cell storage area 32.

The CPU 11 calculates power to be consumed for each cell and total power to be consumed in the entire chip (step S23), and analyzes a power supply network by using the power consumed for each cell and a resistance network of power supply (step S24). In step S23, a voltage which is set beforehand is used when the repeat process is conducted at a first time, and a voltage which is defined in step S26-4 is used when the repeat process is conducted at a second time or later, so as to calculate the power for each cell and the total power to be consumed in the entire chip.

Next, the CPU 11 calculates the IR-drop for each cell based on a length of a power supply terminal acquired from a result of the calculated power and the analysis of the power supply network in the step S23. The CPU 11 calculates power decreased due to the IR-drop by using the calculated IR-drop and sets as an IR-drop to use (step S25).

After that, the CPU 11 determines whether or not the repeat process is conducted at the first time, by referring to values stored in the specific cell storage area 32 (step S26). When the specific cell storage area 32 is initialized, the CPU 11 determines that it is the first time. On the other hand, when the specific cell storage area 32 stores the cell identification information, the CPU 11 determines that it is not the first time.

In step S26, when the repeat process is conducted for the first time, the CPU 11 specifies a greatest IR-drop value, which indicates a voltage when the IR-drop-occurs at the greatest difference from the IR-drop value for each cell calculated in the step S25, specifies a cell which causes the greatest IR-drop, and sets the specified cell to the specific cell storage area 32 (step S26-2).

Subsequently, the CPU 11 defines a voltage after the IR-drop for each cell, by using the IR-drop value for each cell calculated in the step S25 (step S26-4). After that, the CPU 11 goes back to the step S23 to repeat the above-described process.

On the other hand, in the step S26, when the repeat process is conducted for the second time or more, the CPU 11 determines whether or not a difference between a current IR-drop value of the cell specified in the step S26-2 and the previous IR-drop value is equal to or less than a predetermined value, by referring to the specific cell storage area 32 (step S27). For example, the predetermined value may be set as one percent of the previous IR-drop.

In the step S27, when the difference is not more than the predetermined value, the CPU 11 advances to the step S26-4 to repeat the above-described process.

On the other hand, in the step S27, when the difference is equal to or less than the predetermined value, the CPU 11 conducts the delay calculation and the timing analysis considering the IR-drop (step S28). After the delay calculation and the timing analysis, the IR-drop value for each cell is used as a voltage value.

The CPU 11 determines whether or not there is an error, based on the analysis result (step S29). When there is an error, the CPU 11 modifies a layout by changing the layout data 31 (step S29-2), and goes back to the step S21 to repeat the above-described process. On the other hand, when there is not an error, the CPU 11 terminates the circuit design process.

In the step S25 in the above-described circuit design process, the power consumed due to the previous IR-drop value is used to calculate the current IR-drop value.

For a determination process in the step S27, the predetermined value to be compared may be set by a user so as that a count of the repeat process is restricted within a count considering a TAT (Turn Around Time).

Next, a data structure developed in a storage area by the repeat process will be described. FIG. 3A, FIG. 3B, and FIG. 3C are diagrams illustrating the data structure developed by the repeat process according to the embodiment. In FIG. 3A through FIG. 3C, by the repeat process conducted in the circuit design method described with reference to FIG. 2, values are stored to items a voltage (V), power (W), power consumption (W), an IR-drop (V), and a like in the storage area by corresponding to the cell identification information read from the layout data 31 for each cell.

For example, when one voltage is defined as an initial voltage for each of cells, by the step S23 through the step S25 in FIG. 2 at a first repeat in FIG. 3A, as a result of the first repeat, one volt for the voltage item, Pa1 watt for the power item, one volt for the IR-drop item are set as values for the cell identification information "cell A", one volt for the voltage item, Pb1 watt for the power item, 0.8 volt for the IR-drop item are set as values for the cell identification information "cell B", . . . , and then, a total amount of Pa1, Pb1, . . . (Pa1+Pb1+ . . . ) watt is set for the power consumption item of the entire chip, as shown in FIG. 3A.

In the step S26-4 in FIG. 2, the IR-drop value of the first repeat in FIG. 3A is referred to for a second repeat, as shown in FIG. 3B, one volt is set as the voltage value for the cell identification information "cell A" and 0.8 volt is set as the voltage value for the cell identification information "cell B" in the storage area beforehand for the second repeat. Similarly, voltage values after the IR-drop are set beforehand for other cells.

As a result of the second repeat in the storage area, values of the voltage item, the power item, and the IR-drop are stored similar to the first repeat. For example, in FIG. 3B, at the second repeat, one volt for the voltage item, Pa1 watt for the power item, and one volt for the IR-drop are stored as values for the cell identification information "cell A", 0.8 volt for the voltage item, Pb2 watt for the power item, and 0.9 volt for the IR-drop are stored as values for the cell identification information "cell B", . . . , and the total amount of Pa1, Pb2, . . . (Pa1+Pb2+ . . . ) watt is set for the power consumption item of the entire chip.

For example, in a case in which the predetermined value to be compared in the step S27 in FIG. 2 is defined as one percent with respect to the previous IR-drop value and the cell identification information "cell B" is stored in the specific cell storage area 32, a difference between the IR-drop values at the second repeat and the first repeat of the cell identification information "cell B" is 0.1 voltage. Accordingly, since it is determined in the step S27 that the IR-drop value at the second repeat is more than one percent (0.08 voltage difference) of the IR-drop value at the first repeat, the repeat process is continued.

In the step S26-4 in FIG. 2, the IR-drop value at the second repeat in FIG. 3B is referred to for a third repeat, as shown in FIG. 3C, one voltage is set for the voltage item of the cell identification information "cell A", and 0.9 voltage is set for the voltage item of the cell identification information "cell B". Similarly, voltage values after the IR-drop are set beforehand for other cells.

As a result of the third repeat, values of the voltage item, the power consumption item, the IR-drop item are stored in the storage area for each cell, similar to the first and second repeats. For example, as shown in FIG. 3C, at the third repeat, one voltage for the voltage item, Pa1 watt for the power item, and one voltage for the IR-drop item are stored for the cell identification information "cell A", 0.9 voltage for the voltage item, Pb3 watt for the power item, and 0.95 voltage for the IR-drop item are stored for the cell identification information "cell B", . . . , and the total amount of Pa1, Pb3, . . . (Pa1+Pb3+ . . . ) watt is set for the power consumption item of the entire chip.

A difference between the IR-drop values at the third repeat and the second repeat for the cell identification information "cell B" is 0.05 voltage. In the step S27, it is determined that the IR-drop value at the third repeat is less than the IR-drop value at the second repeat. Accordingly, the repeat process is not continued and the step S28 is conducted.

As described above, the IR-drop value is calculated every time the repeat process is conducted, the power consumption is calculated considering the IR-drop. Therefore, it is possible to acquire more accurate values which are closer to values at a practical circuit operation.

Referring to FIG. 3A through FIG. 3C, in order to guarantee 0.95 volt through one volt, for example, circuits may be designed in an order from 0.94 volt through 1.1 volt. On the other hand, if the above-described repeat process is not conducted, only values acquired at the first repeat are considered. As a result, it is required to guarantee from 0.8 volt through one volt, and the chip size and cost are increased.

In the circuit design method according to the embodiment, a cell of which the IR-drop is the greatest in other cells is specified and a convergence of the IR-drop is determined for the cell having the greatest IR-drop every time the repeat process is conducted. Accordingly, it is possible to determine a more precise voltage range to be guaranteed and it is possible to acquire more accurate power consumption. Therefore, it is not required to guarantee more than necessary and it is possible to properly conduct the circuit design.

According to the aforementioned embodiment, it is possible to calculate the power consumption considering the IR-drop.

Alternatively, the circuit design method can be realized by a program product for causing a computer to perform the above-described step, a computer-readable recording medium recorded with a computer program for causing the computer to perform the above-described step, and a simulation system concerning a circuit design for performing the above-described step.

The present invention is not limited to the specifically disclosed embodiments, and variations and modifications may be made without departing from the scope of the embodiment.

What is claimed is:

1. A circuit design method performed in a circuit design system including a computer having computer-readable instructions embodied on a computer-readable storage device, in which the computer-readable instructions when executed by the computer causes the computer to design a circuit, said circuit design method comprising:

calculating power to be consumed by each of cells by using layout data in which a placement and routing is completed;

calculating a current IR drop value by calculating a voltage decreased due to an IR drop for each cell by using the power for each cell;

specifying a greatest IR-drop value which indicates a voltage where a greatest IR-drop occurs, from IR-drop values of the cells calculated in the calculating the IR-drop, and specifying a cell having the greatest IR-drop value, when a repeat process is a first time;

determining whether a difference between the current IR drop value and a previous IR drop value of the cell specified in the specifying the greatest IR-drop value is equal to or less than a predetermined value, when the repeat process is a second time or later; and defining a voltage after the IR drop occurs for each cell by using the IR drop value when the difference is greater than the predetermined value, wherein after the cell having the greatest IR-drop value is specified, the computer is caused to repeat the calculating the power by using the defined voltage, the calculating the current IR drop value by using a recalculated power, and the defining the value after the IR drop occurs until the difference becomes equal to or less than the predetermined value.

2. The circuit design method as claimed in claim 1, wherein the calculating the power calculates the power of each of the cells by using the voltage of each of the cells defined in the defining the voltage, and calculates a total amount of power as a power consumption by using the calculated power of each of the cells.

3. The circuit design method as claimed in claim 1, further comprising:

analyzing a power supply network by using the power calculated in the calculating the power for each cell and a resistance network of power supply, wherein the calculating the IR drop value calculates the voltage decreased due to the IR drop for each cell, based on the power and a length of a power supply terminal acquired from the analyzing the power supply network for each cell.

4. The circuit design method as claimed in claim 1, further comprising:

conducting a delay calculation and a timing analysis when the difference between the current IR-drop value and the previous IR-drop value is equal to or less than the predetermined value.

5. The circuit design method as claimed in claim 4, wherein the delay calculation and the timing analysis are conducted by using the IR-drop value of each of the cells as a voltage value.

6. A circuit design system including a computer having computer-readable instructions embodied on a computer-readable storage device, in which the computer-readable instructions when executed by the computer causes the computer to design a circuit, said circuit design system comprising:

a power calculation part configured to calculate power of each of cells by using layout data in which a placement and routing is completed;

a current IR drop value calculation part configured to calculate a current IR drop value by calculating a voltage decreased due to an IR drop for each cell by using the power for each cell;

a specifying part configured to specify a greatest IR-drop value which indicates a voltage where a greatest IR-drop occurs, from IR-drop values of the cells calculated in the calculating the IR-drop, and specifying a cell having the greatest IR-drop value, when a repeat process is a first time;

a determination part configured to determine whether a difference between the current IR drop value and a previous IR drop value of the cell specified in the specifying the greatest IR-drop value is equal to or less than a predetermined value, when the repeat process is a second time or later; and a voltage definition part configured to define a voltage after the IR drop occurs for each cell by using the IR drop value when the difference is greater than the predetermined value, wherein after the cell having the greatest IR-drop value is specified, the power calculation part using the defined voltage, the current IR drop value calculation part using a recalculated power, and the voltage definition part are repeated until the determination part determines that the difference becomes equal to or less than the predetermined value.

7. A program product causing a computer to design a circuit, said program product comprising a computer-readable storage device encoded with a computer program that comprises the codes for:

calculating power of each of cells by using layout data in which a placement and routing is completed;

calculating a current IR drop value by calculating a voltage decreased due to an IR drop for each cell by using the power for each cell;

specifying a greatest IR-drop value which indicates a voltage where a greatest IR-drop occurs, from IR-drop values of the cells calculated in the calculating the IR-drop, and specifying a cell having the greatest IR-drop value, when a repeat process is a first time;

determining whether a difference between the current IR drop value and a previous IR drop value of the cell specified in the specifying the greatest IR-drop value is equal to or less than a predetermined value, when the repeat process is a second time or later; and defining a voltage after the IR drop occurs for each cell by using the IR drop value when the difference is greater than the predetermined value, wherein after the cell having the greatest IR-drop value is specified, the computer is caused to repeat the calculating the power by using the defined voltage, the calculating the current IR drop value by using a recalculated power, and the defining the value after the IR drop occurs until the difference becomes equal to or less than the predetermined value.

* * * * *